United States Patent
Ke et al.

(10) Patent No.: US 10,122,445 B2
(45) Date of Patent: Nov. 6, 2018

(54) METHOD FOR ENHANCING OPTICAL SIGNAL-TO-NOISE RATIO MEASURING PRECISION BY CORRECTING SPECTRAL RESOLUTION

(71) Applicant: HUAZHONG UNIVERSITY OF SCIENCE AND TECHNOLOGY, Wuhan, Hubei (CN)

(72) Inventors: Changjian Ke, Hubei (CN); Deming Liu, Hubei (CN); Guo Yin, Hubei (CN); Chen Xing, Hubei (CN)

(73) Assignee: HUAZHONG UNIVERSITY OF SCIENCE AND TECHNOLOGY, Hubei, Wuhan (CN)

( * ) Notice: Subject to any disclaimer, the term of this patent is extended or adjusted under 35 U.S.C. 154(b) by 78 days.

(21) Appl. No.: 15/314,014

(22) PCT Filed: Sep. 20, 2016

(86) PCT No.: PCT/CN2016/099413
§ 371 (c)(1),
(2) Date: Nov. 25, 2016

(87) PCT Pub. No.: WO2018/045603
PCT Pub. Date: Mar. 15, 2018

(65) Prior Publication Data
US 2018/0183515 A1 Jun. 28, 2018

(30) Foreign Application Priority Data
Sep. 9, 2016 (CN) .......................... 2016 1 0815635

(51) Int. Cl.
*H04B 10/00* (2013.01)
*H04B 10/079* (2013.01)

(52) U.S. Cl.
CPC ..... *H04B 10/07953* (2013.01); *H04B 10/079* (2013.01); *H04B 10/07955* (2013.01); *H04B 10/07957* (2013.01)

(58) Field of Classification Search
CPC ........ H04B 10/0775; H04B 140/07953; H04B 10/079; H04B 10/07953; H04B 10/07955; H04B 10/7957; H04J 2203/0073
(Continued)

(56) References Cited

U.S. PATENT DOCUMENTS 5,986,782 A * 11/1999 Alexander ........... H04B 10/077
398/26
6,493,088 B1 * 12/2002 Hui ........................ G01J 9/02
356/450
(Continued)

FOREIGN PATENT DOCUMENTS

| CN | 101119174 | 2/2008 |
|---|---|---|
| CN | 103968943 | 8/2014 |

(Continued)

OTHER PUBLICATIONS

Wang et al; Enhancing the signal -to-noise ratio of FTIR spectrometers by a digital J-Stop; Aug. 2017; Optical Society of America.*

*Primary Examiner* — Amritbir Sandhu
(74) *Attorney, Agent, or Firm* — Hamre, Schumann, Mueller & Larson, P.C.

(57) ABSTRACT

A method for enhancing optical signal-to-noise ratio measuring precision by correcting spectral resolution is provided, which can obtain optical signal-to-noise ratio with enhanced measuring precision, by measuring actual power of broad spectrum signals in a certain bandwidth, determining the sum of the power of the sampling points for the broad spectrum signals in the bandwidth by using an optical spectrum analyzer, obtaining the corrected resolution of the optical spectrum analyzer, and replacing the setting resolu- (Continued)

tion of the optical spectrum analyzer with the corrected resolution. The method can effectively solve the problem of large OSNR measuring error resulted from the difference between the setting resolution and the actual resolution of optical spectrum analyzer. The method is applicable to correct resolution for all optical spectrum analyzers, and also applicable to enhance the measuring precision for all OSNR measuring methods based on spectrum analysis, and has the advantages of easiness to handle and implement.

4 Claims, 2 Drawing Sheets

(58) Field of Classification Search
USPC .............................................. 398/26, 27, 38
See application file for complete search history.

(56) References Cited

U.S. PATENT DOCUMENTS

| | | | |
|---|---|---|---|
| 7,340,127 B1* | 3/2008 | Chang ....................... | G01J 3/10 385/24 |
| 9,621,263 B2* | 4/2017 | Wei ................... | H04B 10/07953 |
| 9,876,566 B1* | 1/2018 | Fludger ............ | H04B 10/07951 |
| 2002/0044322 A1* | 4/2002 | Blumenthal ........... | H04B 10/00 398/147 |
| 2003/0030859 A1* | 2/2003 | Youn .................... | H04B 10/077 398/5 |
| 2004/0212428 A1* | 10/2004 | Ode ....................... | H03F 1/3247 330/149 |
| 2006/0153498 A1* | 7/2006 | Shen ................... | G02B 6/12019 385/24 |
| 2008/0124076 A1 | 5/2008 | Rudolph et al. | |
| 2009/0257534 A1* | 10/2009 | Wu ..................... | H04L 27/0014 375/344 |
| 2013/0336647 A1* | 12/2013 | Le Taillandier De Gabory .......... | H04B 10/0775 398/25 |
| 2015/0010299 A1* | 1/2015 | Wei .................. | H04B 10/07953 398/26 |
| 2016/0056891 A1* | 2/2016 | Chen ................ | H04B 10/07953 398/26 |
| 2016/0308611 A1* | 10/2016 | Oda ........................ | H04J 14/06 |

FOREIGN PATENT DOCUMENTS

| | | |
|---|---|---|
| CN | 104052544 | 9/2014 |
| CN | 104079347 | 10/2014 |
| EP | 1376900 | 1/2004 |

* cited by examiner

METHOD FOR ENHANCING OPTICAL SIGNAL-TO-NOISE RATIO MEASURING PRECISION BY CORRECTING SPECTRAL RESOLUTION

TECHNICAL FIELD

The invention relates to the field of optical performance monitoring technology, and more particularly, to a method for enhancing optical signal-to-noise ratio measuring precision by correcting spectral resolution.

BACKGROUND OF THE INVENTION

Optical Signal to Noise Ratio (OSNR) is a ratio of signal power in a channel to noise power in a specific bandwidth range. OSNR indicates the level of noise in the signal, and is one of important technical indicators for optical performance monitoring.

Generally, OSNR is measured by out-of-band monitoring method based on an optical spectrum analyzer (OSA), which is recommended by ITU-T G.697. This method is characterized in that OSNR is calculated by estimating noise in channels with interchannel noise, and is widely used since it is easy and does not affect service.

This OSNR measuring method based on spectrum analysis has the following disadvantage: due to the factors such as mechanical adjustment in OSA or external environment change and so on, its setting resolution may be different from its actual resolution, which results in low precision for measuring OSNR based on the spectrum method.

SUMMARY OF THE INVENTION

In view of the above-mentioned problems in the prior art, the present invention provides a method for enhancing optical signal-to-noise ratio measuring precision by correcting spectral resolution, which aims to replace the setting resolution of OSA with corrected resolution, so as to obtain OSNR, thereby solving the problem of large error resulted from the difference between setting resolution and actual resolution when OSNR is measured by using OSA.

In order to achieve the objective of the invention, a method for enhancing optical signal-to-noise ratio measuring precision by correcting spectral resolution is provided, including the following steps of:

(1) obtaining actual power $P_{Ai}$ of a series of broad spectrum signals which have a central wavelength of $\lambda$, a bandwidth of $\Delta\lambda_1$, a power interval of $\Delta P_z$, and a power range of $(P_{min} \sim P_{max})$, wherein, i=1, 2, ..., n; z=1; $P_{min}$ is the minimal power of broad spectrum signals; $P_{max}$ is the maximum power of broad spectrum signals; the power range of $(P_{min} \sim P_{max})$ of the broad spectrum signals could cover the dynamic range of power of signals under test;

(2) measuring a spectrum of each signal for the above series of broad spectrum signals by using OSA, adding up the power of sampling points which fall into the spectrum range having a central wavelength of $\lambda$ and a bandwidth of $\Delta\lambda_1$, to obtain a sum of power of the sampling points, thereby to obtain a series of sums $P_{Bi}$ for the above series of broad spectrum signals; in which, i=1, 2, ..., n, wherein, a display central wavelength of the OSA is set to be $\lambda$, a display wavelength range of the OSA is set to be $\Delta\lambda_1$, a wavelength interval between adjacent sampling points is $\Delta\lambda_2$; the number of sampling points is n; the value of setting resolution is $Res_{set}$; and $n \cdot Res_{set} \geq \Delta\lambda_1$;

(3) obtaining corrected resolutions $Res_i = P_{Bi} \cdot \Delta\lambda_2 / P_{Ai}$, according to the actual power $P_{Ai}$ of the series of broad spectrum signals, the sums $P_{Bi}$ of power of the sampling points, and the wavelength interval $\Delta\lambda_2$;

(4) fitting the corrected resolutions $Res_i$ and the sums $P_{Bi}$ of power of the sampling points by the least squares method, to obtain a fitting expression of $(Res-P_B)$;

(5) substituting the above series of sums $P_{Bi}$ of power of sampling points in the step (2) into the fitting expression of $(Res-P_B)$, to obtain a series of corrected resolutions $RES'_i$ after being fitted;

obtaining measured power of the series of broad spectrum signals $P'_{Ai} = P_{Bi} \cdot \Delta\lambda_2 / RES'_i$, according to the series of corrected resolutions $RES'_i$ after being fitted, the sums $P_{Bi}$ of power of the sampling points, and the wavelength interval $\Delta\lambda_2$;

(6) according to the actual power $P_{Ai}$ and the measured power $P'_{Ai}$ of broad spectrum signals, calculating relative errors $$\left|\frac{P_{Ai} - P'_{Ai}}{P_{Ai}}\right|;$$

and determining whether the following formula $$\left|\frac{P_{Ai} - P'_{Ai}}{P_{Ai}}\right| < \varepsilon$$

is satisfied, if yes, it is indicated that the corrected resolution can replace the actual resolution;

performing step (7);

if no, it is indicated that there is a large error between the corrected resolution and the actual resolution; then, making $\Delta P_A = \Delta P_z / 2$, z=z+1, and repeating steps (1)-(5), wherein, $0 < \varepsilon < 1$;

(7) measuring a spectrum of a signal under test under the same settings as in the step (2) by using OSA, to obtain corrected resolutions corresponding to sampling points required by calculating OSNR in the spectrum; replacing the setting resolutions with the corrected resolutions to obtain OSNR.

Preferably, for the above method for enhancing optical signal-to-noise ratio measuring precision by correcting spectral resolution, step (7) includes the following sub-steps of:

(7.1) measuring the spectrum of the signal under test which has a central wavelength of $\lambda$ and a bandwidth of $\Delta\lambda_3$, under the same settings as in the step (2) by using OSA;

substituting $P_{Bj} = P_{aj} \cdot \Delta\lambda_1 / \Delta\lambda_2$ into the fitting expression of $(Res-P_B)$, to obtain the corrected resolutions $Res_{aj}$ corresponding to the sampling points required by calculating OSNR in the spectrum, wherein, $P_{aj}$ are the power of the sampling points required by calculating OSNR in the spectrum, j=1, 2, ..., m, and $\Delta\lambda_3 \leq \Delta\lambda_1$;

(7.2) obtaining a total power of the signal under test $$P(\Delta\lambda_3) = \sum_{k=1}^{t} \frac{P_{bk} \cdot \Delta\lambda_2}{Res_{bk}},$$

wherein, $P_{bk}$ are the power of sampling points which fall into the spectrum range having a central wavelength of $\lambda$ and a bandwidth of $\Delta\lambda_3$, k=1, 2, ..., l; $Res_{bk}$ are the corrected resolutions corresponding to the power of sampling points $P_{bk}$;

(7.3) obtaining a total power of noise $$N(\Delta\lambda_3) = f\left[\sum_{t=1}^{s} \frac{P_{ct} \cdot \Delta\lambda_2}{Res_{ct}}, \sum_{p=1}^{q} \frac{P_{dp} \cdot \Delta\lambda_2}{Res_{dp}}\right],$$

wherein, $f$ is an undetermined function, and its specific expression is determined according to a used OSNR measurement method; $P_{ct}$ and $P_{dp}$ are the power of sampling points in the spectrum range required by calculating noise, t=1, 2, ..., s, p=1, 2, ..., q; $Res_{ct}$ and $Res_{dp}$ are corrected resolutions corresponding to the power $P_{ct}$ and $P_{dp}$ of sampling points, respectively;

(7.4) obtaining optical signal to noise ratio $$OSNR = 10lg\frac{P(\Delta\lambda_3) - N(\Delta\lambda_3)}{N(\Delta\lambda_3) \cdot \lambda_r/\Delta\lambda_3},$$

wherein, $\lambda_r$ is a reference bandwidth, and is set to be 0.1 nm.

In general, comparing to the prior art, the above technical solution in the present invention can achieve the following advantageous effects:

(1) the method for enhancing optical signal-to-noise ratio measuring precision by correcting spectral resolution provided in the invention can obtain the signal power and the noise power in the signals under test more accurately, so as to enhance the OSNR measuring precision, by measuring actual power of the broad spectrum signals in a certain bandwidth, determining the sums of the power of the sampling points in the certain bandwidth for the broad spectrum signals by using an optical spectrum analyzer, obtaining the corrected resolution of optical spectrum analyzer, and replacing the setting resolution with the corrected resolution;

(2) the method is applicable to correct resolution for all optical spectrum analyzers, and also applicable to enhance measuring precision for all OSNR measuring methods based on spectrum analysis, and has the advantages of easiness to handle and implement.

BRIEF DESCRIPTION OF ACCOMPANYING DRAWINGS

SPECIFIC EMBODIMENTS OF THE INVENTION

For clear understanding of the objectives, features and advantages of the invention, detailed description of the invention will be given below in conjunction with accompanying drawings and specific embodiments. It should be noted that the embodiments are only meant to explain the invention, and not to limit the scope of the invention.

The method for enhancing optical signal-to-noise ratio measuring precision by correcting spectral resolution provided in the invention aims to enhance OSNR measuring precision by correcting resolution and reducing the difference between the setting resolution and the actual resolution.

Figure 1:
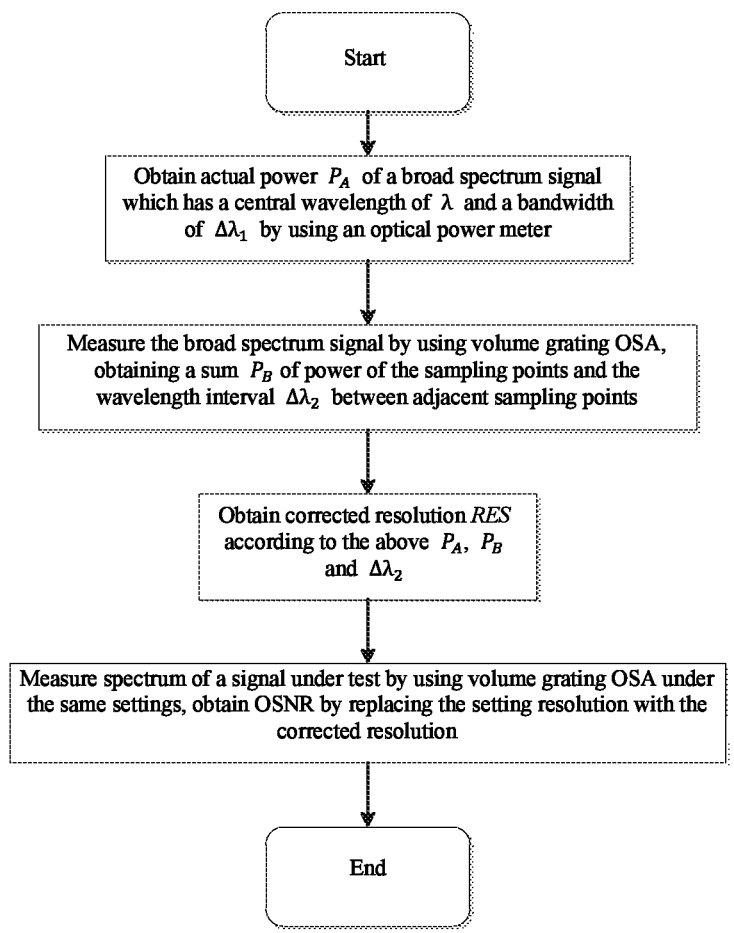
FIG. 1 is a flow chart of a process for enhancing the OSNR measuring precision by correcting the resolution of volume grating OSA in embodiment 1 of the invention.

FIG. 1 illustrates a process for enhancing the OSNR measuring precision by correcting the resolution of volume grating OSA in embodiment 1. The resolution of a conventional volume grating OSA is set according to the slit width of monochromator, and is different from its actual resolution. However, the resolution of volume grating OSA is kept consistent when input power is changed.

Embodiment 1 provides a method for enhancing the OSNR measuring precision by correcting the resolution of volume grating OSA, including the following steps of:

(1) obtaining actual power $P_A$ of a broad spectrum signal which has a central wavelength of $\lambda$ and a bandwidth of $\Delta\lambda_1$ by using an optical power meter, wherein, $P_A$ makes the power of broad spectrum signal to be in the dynamic range of power of signal under test; the broad spectrum signal is generated from an erbium doped fiber amplifier (EDFA), the central wavelength $\lambda$ and bandwidth $\Delta\lambda_1$ of the broad spectrum signal can be obtained by adjusting a tunable filter, and its output power can be controlled by adjusting an optical attenuator;

(2) measuring a spectrum of the above broad spectrum signal by using the volume grating OSA, adding up the power of sampling points which fall into the spectrum range having a central wavelength of $\lambda$ and a bandwidth of $\Delta\lambda_1$, to obtain a sum $P_B$ of power of the above sampling points, wherein, a display central wavelength of the volume grating OSA is set to be $\lambda$, a display wavelength range is set to be $\Delta\lambda_1$, a wavelength interval between adjacent sampling points is $\Delta\lambda_2$; the number of sampling points is n; the value of setting resolution is $Res_{set}$; and $n \cdot Res_{set} \geq \Delta\lambda_1$;

(3) obtaining a corrected resolution $Res=P_B \cdot \Delta\lambda_2/P_A$, according to the actual power $P_A$ of the broad spectrum signal, the sum $P_B$ of power of the sampling points, and the wavelength interval $\Delta\lambda_2$;

(4) measuring a spectrum of a signal under test under the same settings as in the step (2) by using the volume grating OSA, replacing a setting resolution with a corrected resolution to obtain OSNR, which specifically includes the following sub-steps of:

(4.1) measuring the spectrum of the signal under test which has a central wavelength of $\lambda$ and a bandwidth of $\Delta\lambda_3$, under the same settings as in the step (2) by using the volume grating OSA, wherein $\Delta\lambda_3 \leq \Delta\lambda_1$;

(4.2) obtaining a total power of the signal under test $$P(\Delta\lambda_3) = \sum_{k=1}^{L} \frac{P_k \cdot \Delta\lambda_2}{Res},$$

wherein, $P_k$ are the power of sampling points which fall into the spectrum range having a central wavelength of $\lambda$ and a bandwidth of $\Delta\lambda_3$, k=1, 2, ..., l;

(4.3) obtaining a total power of noise: in the case that OSNR is measured by an out-of-band monitoring method, the total power of noise $$N(\Delta\lambda_3) = \left(\frac{P(\lambda - \Delta\lambda)}{Res} + \frac{P(\lambda + \Delta\lambda)}{Res}\right) \cdot \frac{\Delta\lambda_3}{2},$$

wherein, $P(\lambda-\Delta\lambda)$ and $P(\lambda+\Delta\lambda)$ are the power of sampling points at wavelengths of $\lambda-\Delta\lambda$ and $\lambda+\Delta\lambda$, respectively, wherein, $\lambda$ indicates central wavelength;

(4.4) obtaining optical signal to noise ratio $$OSNR = 10lg\frac{P(\Delta\lambda_3) - N(\Delta\lambda_3)}{N(\Delta\lambda_3) \cdot \lambda_r/\Delta\lambda_3};$$

wherein, $\lambda_r$ is a reference bandwidth, and is set to be 0.1 nm in embodiment 1.

In the present invention, the signal power and the noise power in the signal under test can be obtained more accurately, so as to enhance the OSNR measuring precision, by obtaining a corrected resolution of volume grating OSA, and replacing a setting resolution with a corrected resolution.

Figure 2:
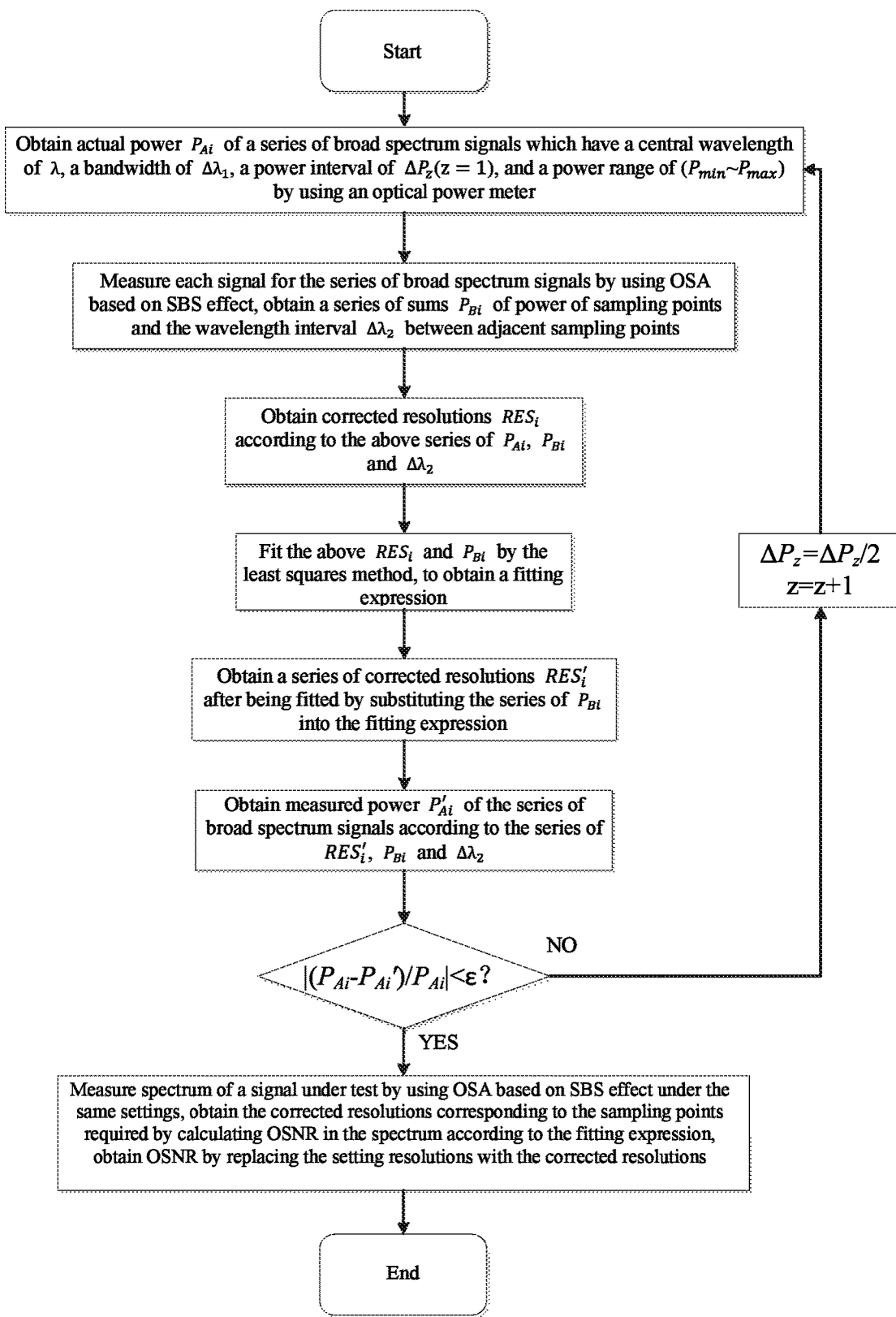
FIG. 2 is a flow chart of a process for enhancing the OSNR measuring precision by correcting the resolution of OSA based on stimulated Brillouin scattering effect in embodiment 2 of the invention.

FIG. 2 illustrates a process for enhancing the OSNR measuring precision by correcting the resolution of OSA based on stimulated Brillouin scattering (SBS) effect in embodiment 2. Unlike volume grating OSA, the actual resolution of which is kept consistent, an actual resolution of OSA based on SBS effect will change as input signal power changes.

Embodiment 2 provides a method for enhancing the OSNR measuring precision by correcting the resolution of OSA based on SBS effect, including the following steps of:

(1) obtaining actual power $P_{Ai}$ of a series of broad spectrum signals which have a central wavelength of $\lambda$, a bandwidth of $\Delta\lambda_1$, a power interval of $\Delta P_z$, and a power range of $(P_{min} \sim P_{max})$ by using an optical power meter, wherein, i=1, 2, . . . , n; z=1; $P_{min}$ is the minimal power of broad spectrum signals; $P_{max}$ is the maximum power of broad spectrum signals; the power range of $(P_{min} \sim P_{max})$ of the broad spectrum signals could cover the dynamic range of power of signals under test; the broad spectrum signals are generated from EDFA, the central wavelength $\lambda$ and bandwidth $\Delta\lambda_1$ of the broad spectrum signals can be obtained by adjusting a tunable filter; and output power can be controlled by adjusting an optical attenuator;

(2) measuring a spectrum of each signal for the series of broad spectrum signals by using OSA based on SBS effect, adding up the power of sampling points which fall into the spectrum range having a central wavelength of $\lambda$ and a bandwidth of $\Delta\lambda_1$, to obtain a sum of power of the sampling points, thereby to obtain a series of sums $P_{Bi}$ for the above series of broad spectrum signals, in which, i=1, 2, . . . , n, wherein, a display central wavelength of OSA based on SBS effect is set to be $\lambda$, a display wavelength range is set to be $\Delta\lambda_1$, a wavelength interval between adjacent sampling points is $\Delta\lambda_2$; the number of sampling points is n; the value of setting resolution is $Res_{set}$; and $n \cdot Res_{set} \geq \Delta\lambda_1$;

(3) obtaining corrected resolutions $Res_i = P_{Bi} \cdot \Delta\lambda_2/P_{Ai}$, according to the actual power $P_{Ai}$ of the series of broad spectrum signals, the sums $P_{Bi}$ of power of the sampling points, and the wavelength interval $\Delta\lambda_2$;

(4) fitting corrected resolutions $Res_i$ and the sums $P_{Bi}$ of power of the sampling points by the least squares method, to obtain a fitting expression of $(Res-P_B)$;

(5) substituting the above series of sums $P_{Bi}$ of power of sampling points in the step (2) into the fitting expression of $(Res-P_B)$, to obtain a series of corrected resolutions $RES'_i$ after being fitted;

obtaining the measured power of the series of broad spectrum signals $P'_{Ai} = P_{Bi} \cdot \Delta\lambda_2/RES'_i$, according to the series of corrected resolutions $RES'_i$ after being fitted, the sums $P_{Bi}$ of power of the sampling points, and the wavelength interval $\Delta\lambda_2$;

(6) according to the actual power $P_{Ai}$ and the measured power $P'_{Ai}$ of broad spectrum signals, calculating relative errors $$\left|\frac{P_{Ai} - P'_{Ai}}{P_{Ai}}\right|;$$

and determining whether the following formula $$\left|\frac{P_{Ai} - P'_{Ai}}{P_{Ai}}\right| < \varepsilon$$

is satisfied, if yes, it is indicated that the corrected resolution can replace the actual resolution; performing step (7);

if no, it is indicated that there is a large error between the corrected resolution and the actual resolution; then, reducing $\Delta P_z$ to make $\Delta P_z = \Delta P_z/2$, z=z+1, repeating steps (1)-(5), wherein, $0 < \varepsilon < 1$;

(7) measuring a spectrum of a signal under test under the same settings as in the step (2) by using OSA based on SBS effect, to obtain corrected resolutions corresponding to the sampling points required by calculating OSNR in the spectrum, replacing the setting resolutions with the corrected resolutions to obtain OSNR, which specifically includes the following sub-steps of:

(7.1) measuring the spectrum of the signal under test which has a central wavelength of $\lambda$ and a bandwidth of $\Delta\lambda_3$, under the same settings as in the step (2) by using OSA based on SBS effect;

substituting $P_{Bj} = P_{aj} \cdot \Delta\lambda_1/\Delta\lambda_2$ into the fitting expression of $(Res-P_B)$, to obtain the corrected resolutions $Res_{aj}$ corresponding to the sampling points required by calculating OSNR in the spectrum, wherein, $P_{aj}$ are power of the sampling points required by calculating OSNR in the spectrum, j=1, 2, . . . , m; $\Delta\lambda_3 \leq \Delta\lambda_1$;

(7.2) obtaining a total power of the signal under test $$P(\Delta\lambda_3) = \sum_{k=1}^{l} \frac{P_{bk} \cdot \Delta\lambda_2}{Res_{bk}},$$

wherein, $P_{bk}$ are power of sampling points which fall into the spectrum range having a central wavelength of $\lambda$ and a bandwidth of $\Delta\lambda_3$, k=1, 2, . . . , l; $Res_{bk}$ are the corrected resolutions corresponding to the power $P_{bk}$ of sampling points;

(7.3) obtaining a total power of noise: in the case that OSNR is measured by an out-of-band monitoring method, the total power of noise $$N(\Delta\lambda_3) = \left(\frac{P(\lambda-\Delta\lambda)}{Res(\lambda-\Delta\lambda)} + \frac{P(\lambda+\Delta\lambda)}{Res(\lambda+\Delta\lambda)}\right) \cdot \frac{\Delta\lambda_3}{2},$$

wherein, $P(\lambda-\Delta\lambda)$ and $P(\lambda+\Delta\lambda)$ are the power of sampling points at wavelengths of $\lambda-\Delta\lambda$ and $\lambda+\Delta\lambda$, respectively, $\lambda$ indicates central wavelength; $Res(\lambda-\Delta\lambda)$ and $Res(\lambda+\Delta\lambda)$ are corrected resolutions corresponding to the power $P(\lambda-\Delta\lambda)$ and $P(\lambda+\Delta\lambda)$ of sampling points, respectively;

(7.4) obtaining optical signal to noise ratio $$OSNR = 10lg\frac{P(\Delta\lambda_3)-N(\Delta\lambda_3)}{N(\Delta\lambda_3)\cdot\lambda_r/\Delta\lambda_3},$$

wherein, $\lambda_r$ is a reference bandwidth, and is set to be 0.1 nm.

It should be appreciated that, for correcting resolution of other kinds of OSA, and for enhancing measuring precision of other OSNR measuring methods based on spectrum analysis, all these methods are included in inventive concept of the present invention.

While preferred embodiments of the invention have been described above, the invention is not limited to disclosure in these embodiments and the accompanying drawings. Any changes or modifications without departing from the spirit of the invention fall within the scope of the invention.

What is claimed is:

1. A method for enhancing optical signal-to-noise ratio (OSNR) measuring precision by correcting spectral resolution, the method comprising steps of:

(1) obtaining actual powers $P_{Ai}$ of a series of broad spectrum signals which have a central wavelength of $\lambda$, a bandwidth of $\Delta\lambda_1$, a power interval of $\Delta P_z$, and a power range of $(P_{min}\text{-}P_{max})$, wherein, i=1, 2, . . . , n; z=1; $P_{min}$ is the minimal power of the broad spectrum signals; and $P_{max}$ is the maximum power of the broad spectrum signals;

(2) measuring a calibration spectrum of each signal for the series of broad spectrum signals by using optical spectrum analyzer (OSA), adding up powers of sampling points which fall into spectrum range having the central wavelength of $\lambda$, the bandwidth of $\Delta\lambda_1$, to obtain a sum of powers of the sampling points, to obtain a series of sums $P_{Bi}$ for the series of broad spectrum signals, wherein, i=1, 2, . . . , n;

(3) obtaining corrected resolutions $Res_i = P_{Bi}\cdot\Delta\lambda_2/P_{Ai}$ according to the actual powers $P_{Ai}$ of the series of broad spectrum signals, the series of sums $P_{Bi}$ of powers of the sampling points, and a wavelength interval $\Delta\lambda_2$ between adjacent sampling points;

(4) obtaining a fitting expression according to the corrected resolutions $Res_i$ and the series of sums $P_{Bi}$ of powers of the sampling points by a least squares method;

(5) obtaining a series of corrected resolutions $RES'_i$ after being fitted according to the series of sums $P_{Bi}$ of powers of sampling points and the fitting expression; obtaining measured powers of the series of broad spectrum signals $P'_{Ai} = P_{Bi}\cdot\Delta\lambda_2/RES'_i$ according to the series of corrected resolutions $RES'_i$ after being fitted, the series of sums $P_{Bi}$ of powers of the sampling points, and the wavelength interval $\Delta\lambda_2$;

(6) according to the actual powers $P_{Ai}$ and the measured powers $P'_{Ai}$ of the broad spectrum signals, obtaining relative errors $$\left|\frac{P_{Ai}-P'_{Ai}}{P_{Ai}}\right|;$$

and determining whether the following formula $$\left|\frac{P_{Ai}-P'_{Ai}}{P_{Ai}}\right|<\varepsilon$$

is satisfied; if yes, performing step (7); or else, making $\Delta P_z = \Delta P_z/2$, z=z+1, and repeating steps (1)-(5), wherein, $0<\varepsilon<1$; and (7) measuring a spectrum of a signal under test, so as to obtain the corrected resolutions corresponding to the sampling points required by calculating OSNR in the spectrum; and obtaining OSNR based on the corrected resolution.

2. The method for enhancing the OSNR measuring precision by correcting spectral resolution according to claim 1, in which the step (7) comprises sub steps of:

(7.1) measuring the spectrum of the signal under test which have the central wavelength of $\lambda$ and a bandwidth of $\Delta\lambda_3$ by using the OSA; substituting $P_{Bi} = P_{aj}\cdot\Delta\lambda_1/\Delta\lambda_2$ into the fitting expression, to obtain the corrected resolutions $Res_{aj}$ corresponding to the sampling points required by calculating the OSNR in the spectrum, wherein, $P_{aj}$ are the powers of the sampling points required by calculating the OSNR in the spectrum, j=1, 2, . . . , m, and $\Delta\lambda_3 \leq \Delta\lambda_4$;

(7.2) obtaining a total power of the signal under test $$P(\Delta\lambda_3) = \sum_{k=1}^{l}\frac{P_{bk}\cdot\Delta\lambda_2}{Res_{bk}},$$

wherein, $P_{bk}$ are the powers of sampling points which fall into the spectrum range having the central wavelength of $\lambda$ and the bandwidth of $\Delta\lambda_3$, k=1, 2, . . . , l; $Res_{bk}$ are the corrected resolutions corresponding to the powers $P_{bk}$ of the sampling points;

(7.3) obtaining a total power of noise $$N(\Delta\lambda_3) = f\left[\sum_{t=1}^{s}\frac{P_{ct}\cdot\Delta\lambda_2}{Res_{ct}}, \sum_{p=1}^{q}\frac{P_{dp}\cdot\Delta\lambda_2}{Res_{dp}}\right],$$

wherein, $P_{ct}$ and $P_{dp}$ are the powers of the sampling points, t=1, 2, . . . , s, p=1, 2, . . . , q; and $Res_{ct}$ and $Res_{dp}$ are corrected resolutions corresponding to the powers $P_{ct}$ and $P_{dp}$ of the sampling points, respectively;

(7.4) obtaining the optical signal to noise ratio $$OSNR = 10\log\frac{P(\Delta\lambda_3)-N(\Delta\lambda_3)}{N(\Delta\lambda_3)\cdot\lambda_r/\Delta\lambda_3}$$

according to the total power of the signal under test and the total power of noise, wherein, A, is a reference bandwidth.

3. A method for enhancing optical signal-to-noise ratio (OSNR) measuring precision by correcting spectral resolution, the method comprising steps of:

(1) obtaining actual power $P_A$ of a broad spectrum signal which has a central wavelength of $\lambda$ and a bandwidth of $\Delta\lambda_1$;

(2) measuring a calibration spectrum of the broad spectrum signal by using volume grating optical spectrum analyzer (OSA), adding up powers of sampling points which fall into spectrum range having the central wavelength of $\lambda$ and the bandwidth of $\Delta\lambda_1$, to obtain a sum $P_B$ of the powers of the sampling points;

(3) obtaining a corrected resolution $Res=P_B\cdot\Delta\lambda_2/P_A$, according to the actual power $P_A$ of the broad spectrum signal, the sum $P_B$ of the powers of the sampling points, and a wavelength interval $\Delta\lambda_2$ between adjacent sampling points;

(4) measuring a spectrum of a signal under test by using the volume grating OSA, and obtaining the OSNR based on the corrected resolution.

4. The method for enhancing the OSNR measuring precision by correcting spectral resolution according to claim 3, in which the step (4) comprises:

(4.1) measuring the spectrum of the signal under test which has the central wavelength of $\lambda$ and a bandwidth of $\Delta\lambda_3$ by using the volume grating OSA, wherein, $\Delta\lambda_3 \leq \Delta\lambda_1$;

(4.2) obtaining a total power of the signal under test $$P(\Delta\lambda_3) = \sum_{k=1}^{l} \frac{P_k \cdot \Delta\lambda_2}{Res},$$

wherein, $P_k$ are the powers of the sampling points which fall into the spectrum range having the central wavelength of $\lambda$ and the bandwidth of $\Delta\lambda_3$, k=1, 2, . . . , l;

(4.3) obtaining a total power of noise $$N(\Delta\lambda_3) = \left(\frac{P(\lambda-\Delta\lambda)}{Res} + \frac{P(\lambda+\Delta\lambda)}{Res}\right)\cdot\frac{\Delta\lambda_3}{2},$$

wherein, $P(\lambda-\Delta\lambda)$ and $P(\lambda+\Delta\lambda)$ are the powers of the sampling points at wavelengths of $\lambda-\Delta\lambda$ and $\lambda+\Delta\lambda$, respectively, wherein, $\lambda$ indicates the central wavelength; and (4.4) obtaining the optical signal to noise ratio $$OSNR = 10\log\frac{P(\Delta\lambda_3) - N(\Delta\lambda_3)}{N(\Delta\lambda_3)\cdot\lambda_r/\Delta\lambda_3},$$

wherein, $\lambda_r$ is a reference bandwidth.

\* \* \* \* \*